Patented Dec. 25, 1945

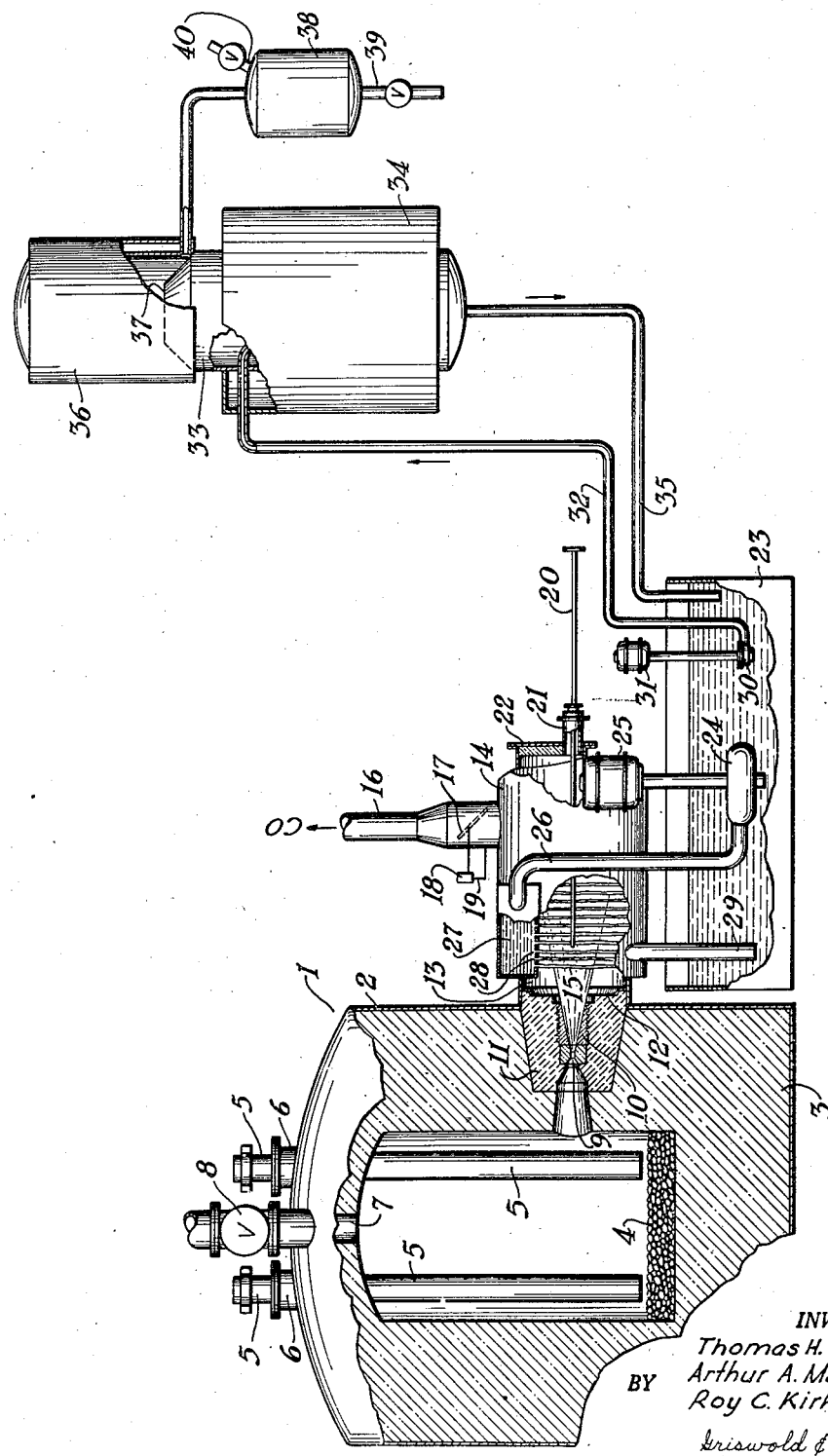

2,391,728

UNITED STATES PATENT OFFICE 2,391,728

PRODUCTION OF ALKALI METALS

Thomas H. McConica, III, Arthur A. MacPhail, and Roy C. Kirk, Midland, Mich., assignors to The Dow Chemical Company, Midland, Mich., a corporation of Michigan Application October 30, 1944, Serial No. 561,132

14 Claims. (Cl. 75—66)

This invention relates to the thermal production of alkali metals.

A number of processes for the thermal production of sodium and other alkali metals have been operated in the past, but each was ultimately abandoned as uneconomic because of the low yields which were experienced.

It is accordingly an object of the present invention to provide an improved thermal process for making alkali metals in which the product is obtained at a high rate with good efficiency and in which many of the troubles of earlier practice are avoided.

In the process of the invention, a charge mixture of a reducible alkali metal compound and a reducing agent is heated in a confined zone, preferably though not necessarily at a pressure of at least 0.5 atmosphere, to a temperature sufficient to form alkali metal vapor. This vapor is then allowed to expand through a restricted orifice into a quenching zone, preferably at a pressure of 0.4 to 4 inches of mercury absolute, and is there chilled rapidly to a temperature such as to condense the vapors to alkali metal. The chilling is most suitably effected by passing the metal vapor into contact with a substantially non-volatile molten metal absorbent, such as lead, from which the alkali metal may be later recovered, as by distillation.

By operating in this manner, liberation of the alkali metal vapors may be carried out in a furnace of simple construction, at high rate and with minimum entrainment of charge particles. At the same time, the condensation of the metal vapors, being in a separate zone, may be carefully controlled so that little loss occurs. Exceedingly high over-all recovery efficiencies can be realized.

The invention may be further explained with reference to the accompanying drawing, which illustrates, in vertical partial cross-section, one arrangement of apparatus for carrying out the new process.

For the sake of simplicity, the operation of the apparatus will be described assuming the production of metallic sodium from a charge mixture of sodium carbonate and carbon, according to the equation

$$Na_2CO_3 + 2C = 2Na + 3CO$$

although other charge mixtures are equally operable, as will be later discussed.

In the equipment illustrated, the vapor mixture of sodium and carbon monoxide is liberated in an arc furnace 1 formed of a gas-tight steel shell 2 lined with carbon or magnesia refractory brick 3, and having a hearth 4 of broken coke. The furnace is heated electrically by arcs struck between the hearth and graphite electrodes 5 which enter through water-cooled gas-tight glands 6. The charge mixture is fed in through an upper inlet 7 provided with a variable-speed rotary lock 8.

The vapor mixture leaves the furnace through a narrow-throated expansion orifice 9 formed in a small block of highly refractory material, such as hard carbon. The diameter of the orifice is ordinarily quite small, being usually only a very few inches, even for furnaces of very large size. The orifice body 9 is held by a refractory bushing 10 in a socket in a thrust-block 11 secured in the furnace wall and seated on a steel ring 12 welded to the furnace shell.

The expanding vapors issuing from the orifice 9 enter a conduit 13 which leads into a gas-tight thermally insulated quench chamber 14. In this chamber, the vapor stream impinges on successive falling streams 15 of a molten metal absorbent, in which the sodium is shock-chilled and condensed. The non-condensable carbon monoxide is continuously exhausted through a stack 16.

The suction in the stack is created by a vacuum pump not shown, and is regulated by a damper 17, which may be rotated by a controller 18 in response to variations in quench pressure conveyed to the controller by a gauge line 19 connected into the stack.

Any solid deposit forming in the orifice 9 may be pushed loose by an alloy steel reamer rod 20 of diameter slightly less than that of the orifice. This rod is mounted slidably opposite the orifice in a gland 21 welded through a cover flange 22 on the end of the quench chamber.

The molten metal absorbent, preferably a molten lead-sodium alloy, is maintained under a protective flux, such as molten sodium hydroxide, in an insulated reservoir 23. A portion of the quench liquid is continuously forced by a pump 24 driven by a motor 25 through an insulated line 26 into a distributing box 27 formed in the top of the chamber 14 above the quench zone. This liquid falls through transverse slots 28 cut in the bottom of the box 27 in the form of wide streams 15 having the effect of liquid sheets or curtains, and is collected in the bottom of the quench chamber and returned to the reservoir 23 through an insulated drain 29.

Part of the quench liquid containing condensed sodium is continuously withdrawn from the reservoir by a pump 30 driven by a motor 31 and is circulated through a line 32 to a still 33. In the still, the liquid cascades through a boiling section set in a furnace 34, heated by burners not shown, and returns to the reservoir through a drain line 35. In the boiling section, sodium vapor distills from the heated liquid and thence passes to a condensing zone cooled externally by a jacket 36 through which cold air may be forced through inlets not shown. The sodium vapor is condensed and flows into an internal collecting ring 37, and from there into a product receiver 38 from which it may be withdrawn as a liquid through a lower valved outlet 39. The distilling system may be evacuated through a second valved outlet 40 in the receiver.

In making sodium in the apparatus illustrated, the arc furnace is maintained at a temperature of at least 1200° C., and the charge mixture of sodium carbonate and carbon is admitted continually through the inlet 7, falling onto the hearth 4 and rapidly evolving a vapor mixture of sodium and carbon monoxide. The pressure in the furnace chamber is maintained roughly constant, preferably at some value above 0.5 atmosphere, by regulating the rate at which the charge is introduced. Small flows of carbon monoxide or other protective gas are introduced into the electrode glands 6 and charge inlet 7 by means not shown to prevent entry of furnace vapors into these openings.

The quench chamber is maintained at a constant pressure in the range from about 0.4 to about 4 inches of mercury absolute by the suction applied through the stack 16 and regulated automatically by the damper controller 18. The temperature of the quench liquid falling through the chamber 14 is controlled preferably below 500° C. by heat exchangers (not illustrated) in the reservoir 23. Likewise, the concentration of sodium in the alloy is held as constant as possible by controlling the operation of the still 33. For example, when the quench liquid is a lead-sodium alloy, the temperature is preferably controlled in the range 375° to 450° C. and the concentration of sodium between 5 and 15 per cent by weight.

The still 33 is exhausted to a good vacuum, i. e. below 0.1 inch of mercury absolute, and the furnace 34 is adjusted to heat the entering alloy to a boiling temperature, usually at least 600° C., while the temperature in the condensing section is best held below 400° C. Under these conditions, sodium vaporizes rapidly from the alloy, is condensed, and enters the receiver 38, from which it is tapped off periodically as product of exceptional purity. The remaining alloy, partially depleted in sodium, is returned to the reservoir 23 for re-use.

When the equipment is operated as just described, the sodium-carbon monoxide vapor mixture is evolved rapidly, but, because of the pressure in the furnace, flows toward the orifice 9 at a relatively low rate, thus entraining few if any charge particles. On reaching the orifice, however, it expands very rapidly, entering the conduit 13 and at once assuming the pressure of the quench chamber. There, because of the low pressure and the shock-chilling action of the quench liquid, there is little tendency for the sodium to react chemically with the accompanying carbon monoxide, and it remains in the elemental state. In addition, excellent intimacy of contact is obtained between the quench liquid and the vapor mixture, since the latter impinges on the flowing liquid at high velocity; little sodium escapes condensation. As a result, of these factors and in contrast to prior processes, there is but slight loss of metal and recovery efficiencies are excellent.

Broadly speaking, in using the new process for the production of alkali metals generally, the charge mixture fed to the furnace zone may contain any reducible alkali metal compound, usually the carbonate or hydroxide, and any metallurgical reducing agent, e. g. carbon, ferrosilicon, or calcium carbide, the two ingredients being preferably in stoichiometric proportions. Carbon, usually in the form of petroleum coke, graphite, ordinary coke, or even coal, is to be preferred as the reducing agent, however, because of its lower cost and the fact that it leaves little solid residue. In making sodium, the charge is preferably a mixture of carbon and a sodium oxide source material, e. g. sodium oxide itself, or more commonly sodium carbonate, sodium hydroxide, or a mixture of sodium chloride and calcium oxide, all of which, at elevated temperatures, appear to decompose with liberation of reducible sodium oxide. Pellets of an intimate mixture of sodium carbonate and petroleum coke, prepared by grinding the ingredients together with a small proportion of pitch, briquetting the mixture and carbonizing the briquettes, are a particularly advantageous form of charge for sodium manufacture.

The liquid used in quenching the alkali metal vapor is most suitably a substantially non-volatile molten metal absorbent miscible with the alkali metal. Lead and lead-alkali metal alloys in which the lead predominates are particularly satisfactory. However, other quenching liquids, including volatile metals miscible with the alkali metals, molten salt mixtures, and heavy oils, may be employed. Likewise, the quenching step is not limited to the use of liquid media, since other shock-chilling means, such as a rotary drum condenser, are contemplated as within the invention in its broader aspects.

Attention is directed to a co-pending application, Serial No. 584,630, filed March 24, 1945, by T. H. McConica, III, et al., in which claims are asserted to the constructional details of the quench condenser, disclosed, but not claimed, in this application.

It is to be understood that the foregoing description is illustrative rather than strictly limitative, and that the invention is co-extensive in scope with the following claims.

What is claimed is:

1. In a method of making an alkali metal, the steps which comprise heating a mixture of a reducible alkali metal compound and a reducing agent at a pressure of at least about 0.5 atmosphere and at a temperature sufficient to form alkali metal vapor, expanding the resulting vapor from such pressure to a reduced pressure between about 0.4 and about 4 inches of mercury absolute, and rapidly chilling the vapor at the latter pressure to a temperature such as to condense alkali metal.

2. In a method of making sodium, the steps which comprise heating a mixture of a reducible sodium compound and carbon at a pressure of at least about 0.5 atmosphere and at a temperature sufficient to form a vapor mixture of sodium and carbon monoxide, expanding the vapor mixture from such pressure to a reduced pressure between about 0.4 and about 4 inches of mercury absolute, and rapidly chilling the mixture at the latter pressure to condense sodium therefrom.

3. A process according to claim 2 in which the reducible sodium compound is sodium carbonate.

4. A process according to claim 2 in which the reducible sodium compound is sodium hydroxide.

5. A process according to claim 2 in which the reducible sodium compound is sodium chloride in admixture with lime.

6. In a method of making an alkali metal, the steps which comprise heating a mixture of a reducible alkali metal compound and a reducing agent in a confined zone to a temperature sufficient to form alkali metal vapor, expanding the vapor directly from the confined zone through a restricted orifice into a vapor conduit maintained at a reduced pressure between about 0.4 and about 4 inches of mercury absolute, conveying the vapor mixture through the conduit to a quench zone maintained at substantially the same reduced pressure, and quenching the vapor mixture in the latter zone to a temperature such as to condense alkali metal.

7. In a method of making sodium, the steps which comprise heating a charge consisting essentially of a sodium oxide source material and carbon in a confined zone at a pressure of at least 0.5 atmosphere to a temperature sufficient to form a vapor mixture containing sodium, expanding the vapor directly from the confined zone through a restricted orifice into a vapor conduit maintained at a reduced pressure between about 0.4 and about 4 inches of mercury absolute, conveying the vapor mixture through the conduit to a quench zone maintained at substantially the same reduced pressure, and quenching the vapor mixture in the latter zone to condense sodium therefrom.

8. A process according to claim 7 in which the pressure in the heating zone is maintained by regulating the rate at which the charge is fed to the zone.

9. A method of making alkali metals which comprises heating a mixture of a reducible alkali metal compound and a reducing agent in a confined zone to a temperature sufficient to form alkali metal vapor, expanding the vapor into a quench zone and therein passing it into intimate contact with a non-volatile molten metal absorbent miscible with the alkali metal and supplied at a temperature such as to condense the alkali metal vapor, and removing absorbent from the quench zone and recovering alkali metal therefrom.

10. A method of making alkali metals which comprises heating a mixture of a reducible alkali metal compound and a reducing agent in a confined zone to a temperature sufficient to form alkali metal vapor, expanding the vapor through a restricted orifice into a quench zone maintained at a reduced pressure between about 0.4 and about 4 inches of mercury absolute and therein passing the expanded vapor into intimate contact with a substantially non-volatile molten metal absorbent miscible with the alkali metal and supplied at a temperature such as to condense the alkali metal vapor, and removing absorbent from the quench zone and recovering alkali metal therefrom.

11. A method of making sodium which comprises heating a furnace zone closed except for a restricted vapor outlet at a temperature of at least 1200° C. and introducing a charge mixture of sodium carbonate and carbon into the zone at a rate sufficient to maintain the pressure of the vapor mixture of sodium and carbon monoxide evolving from the heated charge at at least 0.5 atmosphere, expanding the evolving vapor mixture through the restricted outlet into a quench zone at a pressure between 0.4 and 4 inches of mercury absolute and therein passing the expanded vapor mixture into intimate contact with a substantially non-volatile molten metal absorbent consisting predominantly of lead and maintained at a temperature below 500° C. to condense sodium vapor in the absorbent, exhausting uncondensed carbon monoxide from the quench zone at a rate sufficient to maintain the pressure in the zone within the aforesaid limits, and withdrawing absorbent from the zone and recovering sodium therefrom by distillation.

12. A method of making sodium which comprises heating a mixture of a sodium oxide source material and carbon in a confined zone to a temperature sufficient to form a vapor mixture containing sodium, expanding the mixture through a restricted orifice into a quench zone maintained at a reduced pressure between about 0.4 and about 4 inches of mercury absolute and therein passing the expanded vapors into intimate contact with a molten lead-sodium alloy containing from about 5 to about 15 per cent by weight of sodium and maintained at a temperature below 500° C. to absorb the sodium vapor therein, separating the resulting solution from the vapor mixture while the concentration of sodium therein is still within the aforesaid range, and recovering sodium from the separated absorbent by distillation.

13. A process according to claim 12 in which the sodium oxide source material is sodium carbonate.

14. A process according to claim 12 in which the sodium oxide source material is sodium hydroxide.

THOMAS H. McCONICA, III.
ARTHUR A. MacPHAIL.
ROY C. KIRK.